United States Patent [19]

Schall et al.

[11] Patent Number: 6,013,721
[45] Date of Patent: Jan. 11, 2000

[54] WATERBORNE TRAFFIC PAINTS HAVING FAST DRY CHARACTERISTIC AND METHOD OF PRODUCING TRAFFIC MARKINGS THEREFROM

[75] Inventors: Donald Craig Schall, Lansdale; Steven Scott Edwards, Horsham, both of Pa.

[73] Assignee: Rohm and Haas Company, Philadelphia, Pa.

[21] Appl. No.: 09/176,499

[22] Filed: Oct. 21, 1998

Related U.S. Application Data

[62] Division of application No. 08/879,496, May 22, 1997, Pat. No. 5,861,188
[60] Provisional application No. 60/019,274, Jun. 7, 1996.
[51] Int. Cl.⁷ ............................. C08L 39/00; C08L 33/14
[52] U.S. Cl. .......................... 524/555; 524/515; 524/516; 524/517; 524/522
[58] Field of Search .................................... 524/515, 516, 524/517, 522, 555

[56] References Cited

U.S. PATENT DOCUMENTS

| | | |
|---|---|---|
| 4,054,717 | 10/1977 | Gill et al. . |
| 4,119,600 | 10/1978 | Bakule et al. . |
| 4,131,583 | 12/1978 | Boerwinkle ............................. 524/238 |
| 4,882,372 | 11/1989 | Woo et al. . |
| 5,063,091 | 11/1991 | Martorano . |
| 5,227,421 | 7/1993 | Kageyama et al. . |
| 5,527,853 | 6/1996 | Landy et al. . |

FOREIGN PATENT DOCUMENTS

WO 96/22338  7/1996  WIPO .

*Primary Examiner*—Tae Yoon

[57] ABSTRACT

The present invention is directed to traffic paint compositions, which dry faster than conventional waterborne traffic paints and to a method of producing traffic paint road markings made therefrom. The traffic paint composition of the present invention includes a blend of an anionically stabilized polymer binder, a polyfunctional amine polymer having an amine and an acid functionality therein and an amount of volatile base sufficient to raise the pH of the composition to a point where essentially all of the polyfunctional amine polymer is in a non-ionic state. The traffic paint composition of the present invention further provides improved storage stability.

6 Claims, No Drawings

WATERBORNE TRAFFIC PAINTS HAVING FAST DRY CHARACTERISTIC AND METHOD OF PRODUCING TRAFFIC MARKINGS THEREFROM

This application is a division of application Ser. No. 08/879496, filed on May 22, 1997, now U.S. Pat. No. 5,861,188 issued on Jan. 19, 1999, which claims the benefit of U.S. Provisional Application Ser. No. 60/019,274, filed Jun. 7, 1996.

This invention generally relates to waterborne traffic paints and traffic markings resulting therefrom and more particularly to producing waterborne traffic paints having improved fast dry characteristic even under high humidity conditions.

White and yellow traffic markings used for demarcating traffic lanes is a common sight on almost all roads. These markings ensure safe driving conditions under varying weather conditions. The term "roads" generally means routes, highways, airport runways, exit and entry ramps, passes, pavements, side walks or parking lots for vehicles, such as, autos, bikes, trucks, and the roads are usually paved with asphalt or concrete, generally made from Portland cement. The majority of these traffic markings, such as, solid, transverse or interrupted stripes, are paint-based and traditionally include solvent-borne binders, which are predominantly alkyds and chlorinated rubber-modified alkyds. Since traditional traffic paint coatings contain high levels [19 kilograms per kilometer per year-(Environmental Protection Agency supplied data)] of volatile organic compounds (VOC), they contribute to ozone layer depletion which thereby endangers the environment. Under the increasingly stricter standards of The Clean Air Act, as amended in 1990, high levels of VOC produced by the traditional traffic paint coatings must be substantially reduced.

In the early 1980s, waterborne traffic paints began to receive serious consideration as an environmentally safer alternative to the traditional traffic paints. These waterborne traffic paints are primarily based on acrylic emulsions and therefore dramatically lower VOC emissions [3.7 kilograms per kilometer per year-(Environmental Protection Agency supplied data)]. One of the problems associated with waterborne traffic paints is the amount of time required for a traffic marking to dry after it is applied on a road surface. Since, it is not practical to stop the flow of traffic on a typical road to permit a freshly applied traffic marking to dry, or since, it is not uncommon to have rain water flowing over freshly applied traffic markings, thereby washing away or defacing such freshly applied traffic markings, the amount of time required for the traffic marking to dry is an important product characteristic of any traffic paint. Clinnin et al., for example, in the U.S. Pat. No. 5,340,870 (hereafter '870 patent) disclose a fast dry waterborne traffic marking paint, which attempts to achieve high drying rates by increasing the high solids content in their paint composition and by lowering the water content. However, the problem of drying of the traffic paint road markings under high humidity conditions is still not addressed effectively by the '870 patent. The present invention solves this problem by providing a traffic paint coating composition with improved fast dry characteristic under high humidity conditions while maintaining storage stability.

The present invention is directed to a storage stable fast-cure aqueous composition comprising a blend in an aqueous medium of an anionically stabilized polymer binder having a Tg greater than 0° C., a polyfunctional amine polymer polymerized from a monomer mixture comprising at least one acid and at least one amine monomer, and an amount of volatile base sufficient to raise the pH of the composition to a point where essentially all of the polyfunctional amine polymer is in a non-ionic state.

The present invention is also directed to a method for reducing a dry-to-no-pickup time of a traffic marking on a road surface comprising:

applying on said road surface a layer of an aqueous traffic paint composition comprising a blend in an aqueous medium of an anionically stabilized polymer binder having a Tg greater than 0° C., a polyfunctional amine polymer polymerized from a monomer mixture comprising at least one acid and at least one amine monomer, and an amount of volatile base sufficient to raise the pH of the composition to a point where essentially all of the polyfunctional amine polymer is in a non-ionic state; and evaporating said aqueous evaporable medium from said layer to form said wear resistant traffic marking on said road surface.

Another problem associated with the composition disclosed in the '870 patent is its storage stability. As a result of increasing the high solids content and lowering the water content in the composition of '870 patent, the resulting composition becomes increasingly unstable. The present invention solves this problem by providing a composition having significantly improved storage stability.

As used herein:

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976. For polymers that are soluble in either Tetrahydrofuran or dimethylformamide, polymethylmethacrylate is used as the molecular weight standard. For water soluble polymers, polymethacrylic acid is used as the standard. Prior to the GPC analysis of water soluble polymers, they are treated with potassium hydroxide in ethanol at elevated temperatures, which are sufficient to fully hydrolyze the water soluble polymers. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of an polymer binder system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1, M_2, \ldots M_n$, from which the copolymer is derived by the Tg value for the homopolymer derived from the respective monomer, according to an equation of the form:

$$1/T_{g(copolymer)} = \sum_{i=1}^{n} w_{(Mi)}/T_{g(Mi)} \qquad (1)$$

wherein:

$Tg_{(copolymer)}$ is the estimated glass transition temperature of the copolymer, expressed in degree Kelvin (°K);

$w_{(Mi)}$ is the weight fraction of repeat units in the copolymer derived from an $it^{th}$ monomer $M_i$; and $Tg_{(Mi)}$ is the glass transition temperature, expressed in ° Kelvin (°K), of the homopolymer of an $i^{th}$ monomer $M_i$.

The glass transition temperature of various homopolymers may be found, for example, in "Polymer Handbook", edited by J. Brandrup and E. H. Immergut, Interscience Publishers.

"Dispersed polymer" means particles of polymer colloidally dispersed and stabilized in an aqueous medium.

"Solubilized polymer" includes "Water soluble polymer", "Water reducible polymer" or a mixture thereof. Water soluble polymer means a polymer dissolved in an aqueous medium. Water reducible polymer means a polymer dissolved in water and water miscible solvent. Solubilized polymer results in a polymer solution characterized by having the self-crowding constant (K) of the Mooney equation $[1/\ln_{\eta rel}=1/BC-K/2.5]$ equal to zero. By contrast, dispersed polymer has (K) equal to 1.9. The details of Mooney equation are disclosed in an article entitled *"Physical Characterization of Water Dispersed and Soluble Acrylic Polymers"* by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series.

"Polymer solids" means polymer in its dry state.

The term "(meth)acrylate" includes acrylate and methacrylate.

"Dry-to-No-pickup time" means the time it takes for the layer of wet traffic paint composition to dry out sufficiently to such extent that no paint adheres to a free roll of the rubber test wheels described in ASTM test D 711-89 entitled "Standard Test for No-Pick-Up Time of Traffic Paint". A dry-to-no-pickup time of less than 20 minutes is considered acceptable. By reducing the dry-to-no-pickup time, the fast dry characteristic of the resulting traffic paint composition is improved.

"Storage stability" relates to the degree of fluidity retained by the traffic paint composition. In order to be coatable by conventional coating means, such as, a spraying device or brush, the desired fluidity of the paint composition, expressed as a viscosity, should not increase more than 10 Krebs units when measured in accordance with the procedure described below. Once the composition loses its storage stability, it becomes too viscous to be of any practical value as a coating composition.

The traffic paint composition of the present invention includes a blend in an aqueous evaporable medium containing an anionically stabilized polymer binder having a Tg in the range varying from 0° C. to 60° C., preferably from 10° C. to 40° C., and a GPC weight average molecular weight is in the range varying from 500 to 5,000,000, more preferably from 1,000 to 1,500,000, and most preferably ranging from 30,000 to 1,000,000.

The polymer binder of the composition may be a dispersed polymer, or it maybe a mixture of a water soluble polymer and a dispersed polymer, or a water-reducible polymer, or a mixture of the water soluble and water-reducible polymers, or a mixture of the dispersed, water-reducible and water soluble polymers, all in an aqueous evaporable medium.

The polymer binder in the form of dispersed polymer particles is preferred, wherein the particle size of the dispersed polymer particles varies in the range of from 20 to 1000 nanometers, preferably in the range of from 50 to 500 nanometers, more preferably in the range of from 100 to 350 nanometers. The aqueous evaporable medium includes water or water having dissolved therein a water miscible organic solvent, such as, methanol, ethanol and glycol ethers. Water is preferred.

The polymer binder is polymerized from at least one or more of the following monomers, such as, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylid acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; sodium vinyl sulfonate; phosphoethyl(meth)acrylate; acrylamido propane sulfonate; diacetone acrylamide; glycidyl methacrylate; acetoacetoxyethyl methiacrylate; acrolein and methacrolein; dicyclopentadienyl methiacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimetthylamino (meth)acrylate and acrylonitrile or methacrylonitrile.

The polymer binders polymerized from the following monomeric mixtures are more preferred:

1) butyl acrylate and methyl methacrylate,
2) butyl acrylate and styrene,
3) 2-ethyl hexyl acrylate with methyl methacrylate, or
4) 2-ethyl liexyl acrylate with styrene.

Preferably the monomeric mixture further includes an acrylic or methacrylic acid monomer or a mixture thereof.

The polymerization techniques used for preparing the anionically stabilized polymer binders of the present invention are well known in the art. The polymer binder may be prepared by aqueous solution polymerization or by emulsion polymerization. Emulsion polymerization is preferred. Either thermal or redox initiation processes may be used. Polymers and copolymers of alpha-beta ethylenically unsaturated monomers and their esters, especially the acrylic and methacrylic esters, are preferably prepared by processes given in "Emulsion Polymerization of Acrylic Monomers: May, 1966" published by the Rohm and Haas Company, Philadelphia, Pa.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant, such as, for example, sodium bisulfite, may be used at similar levels.

Chain transfer agents may be used in an amount effective to provide the desired GPC weight average molecular weight. For purposes of regulating molecular weight of the polymer binder being formed, suitable chain transfer agents include well known halo-organiic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctyl mercaptopropionic acid; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When the polymer binder in the form of a dispersed polymer is utilized, the polymer particle size may be controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphe-niol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

Alternatively, the polymer binder may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the polymer binder particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC weight average molecular weight, such as, the multi-stage polymer particle composition disclosed in U.S. Pat. No. 4,916,171.

The multi-stage polymer particles are prepared by conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The polymer binder in the form of the water-reducible polymer or water-soluble polymer may be prepared directly in water if the monomer mix is water-soluble or, as is most often the case, the polymerization solvent is a water-miscible solvent, such as, isopropanol, butyl cellosolve, propylene glycol. In such a case, water may be included in the polymerization mixture or post added after the polymerization is complete. Such polymers may be prepared by utilizing the monomers described earlier. Another route to the preparation of a water-soluble polymer for this invention is to prepare a polymer binder having enough acrylic or methacrylic acid or other polymerizable acid monomer (usually greater than 10 percent) such that the polymer binder can be solubilized by the addition of ammonia or other base. Water-soluble polymers of this type are advantageously used as blends with the dispersed polymers.

The polymer binder may be provided with an acid functionality, which results from including in the range of from 0.3 percent to 20 percent, preferably in the range of from 0.8 percent to 10 percent, more preferably in the range of from 1 percent to 3 percent, of acid monomers listed below in the monomer mixture, all percentages being in weight percent based on the total weight of polymer binder solids. Such an acid functionality results from including in the monomer mixture at least one monoethylenically unsaturated carboxylic acid, such as, acrylic acid, methacrylic acid, itaconiic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids and various mixtures thereof. Other suitable acid monomers include one or more monomethyl itaconate, monomethyl fumarate, monobutyl fumarate, acrylamido propane sulfonate, sodium vinyl sulfonate, 2 acrylamido-2-methylpropanesulfolnic acid, 2-methacryloxyethyl phosphate and phosphoethyl(meth) acrylate. The monoethylenically unsaturated carboxylic acid is preferred and acrylic acid, methacrylic acid and mixtures thereof are more preferred.

The blend of the traffic paint composition of the present invention further includes in the range of from 0.25 percent to 10 percent, preferably in the range of from 0.4 percent to 5 percent and more preferably in the range of from 0.6 percent to 2.5 percent, of a polyfunctional amine polymer having at least one acid and at least one amine functionality, all percentages being in weight percents based on the total weight of blend solids. A water soluble polyfunctional amine polymer is preferred. The polyfunctional amine polymer is provided with a GPC weight average molecular weight is in the range varying from 10,000 to 500,000, preferably in the range varying from 20,000 to 300,000, and more preferably in the range varying from 30,000 to 200,000. If the GPC weight average molecular weight of the polyfunctional amine polymer exceeds the upper limit, the storage stability of the resulting traffic paint composition will be lost and if it falls below the lower limit, the dry-to-no-pick-up time of the resulting traffic paint composition will rise beyond the acceptable limit.

The polyfunctional amine polymer is copolymerized from a monomer mixture containing in the range from 80 percent to 98 percent, preferably in the range from 85 percent to 96 percent, more preferably in the range from 88 to 95 percent, of at least one amine containing monomer and from 20 percent to 2 percent, preferably in the range from 15 percent to 4 percent, more preferably in the range from 12 to 5 percent, of at least one acid containing monomer, all in weight percentages based on the total weight of polyfunctional amine polymer solids.

The acid monomers suitable for use in the preparation of the polyfunctional amine polymer are the same as those described earlier. The monoethylenically unsaturated carboxylic acid is preferred and acrylic acid, methacrylic acid and mixtures thereof are more preferred.

Some of the suitable amine containing monomers include alkylaminoalkyl esters of α, β unsaturated carboxylic acid, such as, acrylic acid, methacrylic acid, itaconic acid, crotonoic acid, aconitic acid, atropic acid, maleic acid, maleic anhlydride, fumaric acid, vinyl benzoic acid, half-esters of ethylenically unsaturated dicarboxylic acids, half-amides of ethylenically unsaturated dicarboxylic acids and various mixtures thereof. The alkylaminoalkyl esters of α, β unsaturated carboxylic acid are preferred. The more preferred alkylaminoalkyl esters of α, β unsaturated carboxylic acid include dimethylaminoethyl(meth)acrylate, beta-aminoethyl (meth)acrylate, t-butylaminoethyl(meth)acrylate, dipropylaminoetlyl (meth)acrylate, methylaminoethyl(meth)acrylate, N-methyl-N-hydroxyethylaminoethyl(meth)acrylate, N-(mono-n-butyl)-4-aminobutyl (meth)acrylate, methacryloxyethoxyethylamine and various mixtures thereof. Dimethylaminoethyl(meth)acrylate is most preferred.

Other suitable amine containing monomers include alkylaminoalkyl amides of unsaturated acids, such as, acrylic acid and methacrylic acid. Some of the exemplars thereof include N-beta-aminoethyl (meth)acrylamide, N-monomethylaminoethyl(meth)acrylamide, dimethylaminopropyl(meth)acrylamide, and mixtures thereof; aminoalkyl vinyl ethers or sulfides, such as, beta-aminoethyl vinyl ether or sulfide, N-monomethyl-beta-aminioethyl vinyl ether or sulfide, N-monobutyl-beta-aminoethyl vinyl ether or sulfide. N-monomethyl-3-anminopropyl vinyl ether or sulfide, and various mixtures thereof; vinyl pyridine, such as, 2-vinyl pyridine, 3-vinyl pyridine, 2-ethyl-5-vinyl pyridine, and various mixtures thereof; N-acryloxyalkyl-oxazolidine; N-acryloxyalkyltetrahydro-1,3-oxazine; and various mixtures thereof.

N-acryloxyalkyl-oxazolidinies and N-acryloxyalkyltetrahydro-1,3-oxazines and the corresponding components in which the "alkyl" linkage is replaced by alkoxyalkyl and poly(alkoxy-alkyl), all of which are embraced by Formula I:

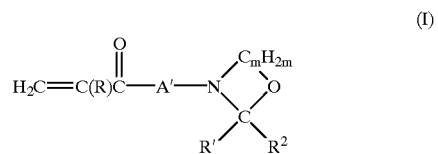

(I)

wherein R is H or $CH_3$;

m is an integer having a value of 2 to 3;

R', when not directly joined to $R^2$, is selected from the group consisting of hydrogen, phenyl, benzyl, and $(C_1-C_2)$ alkyl groups;

$R^2$, when not directly joined to R', is selected from the group consisting of hydrogen and $(C_1-C4)$ alkyl groups;

R' and $R^2$, when directly joined together, form a 5- to 6-carbon ring with the attached carbon atom of the ring in the formula, i.e., R' and $R^2$, when joined together, are selected from the group consisting of pentamethylene and tetramethylene; and A' is $O(C_mH_{2m})$- or $(O\text{-alkylene})_n$ in which $(O\text{-alkylene})_n$ is a poly(oxyalkylene) group, having a GPC number average molecular weight in the range from 88 to 348 and in which the individual alkylene radicals are the same or different and are either ethylene or propylene.

The compounds of Formula I are disclosed in U.S. Pat. Nos. 3,037,006 and 3,502,627.

Some of the preferred examples of compounds of Formula I include:

oxazolidinylethyl methacrylate; oxazolidinylethyl acrylate; 3-(gamma-methacryl-oxypropyl)-tetrahydro-1,3-oxazinie; 3-(beta-methacryloxyethyl)-2,2-pentamethylene-oxazolidine; 3-(beta -methacryloxyethyl-2-methyl-2-propyloxazolidine; N-2-(2-acryloxyethoxy)ethyl-oxazolidine; N-2-(2-methacryloxyethoxy)ethyl-oxazolidine; N-2-(2-methacryloxyethoxy)ethyl-5-methyl-oxazolidine; N-2-(2-acryloxyethoxy)ethyl-5-methyl-oxazolidine; 3-[2-(2-methacryloxyethoxy)ethyl)]-2,2-penta-methylene-oxazolidinie; 3-[2-(2-methacryloxyethoxy)ethyl)]- 2,2-dimethyloxazolidine; 3-[2-(methacryloxyethoxy)ethyl]-2-plhelnyl-oxazolidinie; 2-isopropenyl-2-oxazoline.

The compounds of Formula I can hydrolyze under various conditions to secondary amines. The hydrolysis produces products having the Formula II:

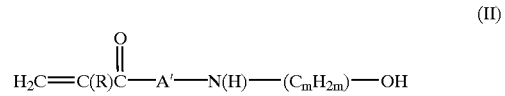

(II)

Polymers of monomers which readily generate amines by hydrolysis are also useful in the preparation of the polyfunctionial amine polymer. Examples of such monomers are acryloxy-ketimines and acryloxy-aldimines, such as, those of the Formulas III and IV shown below:

  (III)

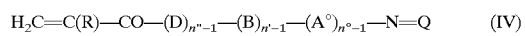  (IV)

wherein R is H or $CH_3$;

Q is selected from the group consisting of:

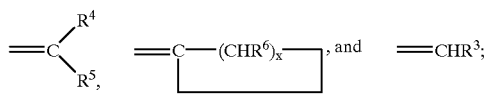

$R^6$ is H or it may be methyl in one $CHR_6$ unit;

$R^5$ is selected from the group consisting of $(C_1-C_{12})$-alkyl and cyclohexyl groups;

$R^4$ is selected from the group consisting of $(C_1-C_{12})$-alkyl and cyclohexyl $R^3$ is selected from the group consisting of phenyl, halophenyl, $(C_1-C_{12})$-alkyl, cyclohexyl, and $(C_1-C_4)$ alkoxyphenyl groups;

A" is an alkylene group $(C_1-C_{12})$;

A°, B and D are the same or different oxyalkylene groups having the formula —OCH($R^7$)—CH($R^7$)— wherein $R^7$ is H, $CH_3$, or $C_2H_5$;

x is an integer having a value of 4 to 5;

n° is an integer having a value of 1 to 200;

n' is an integer having a value of 1 to 200; and n" is an integer having a value of 1 to 200, the sum of n°-1, n'-1 and n"-1 having a value of 2 to 200.

Some of the preferred examples of compounds of Formula III and IV include:

2-[4-(2,6-dimethylheptylidene)-aminio]-ethyl methacrylate;

3-[2-(4-methylpentylidine)-aminio]-propyl methacrylate;

beta-(benzylideneamino)-ethyl methacrylate;

3-[2-(4-methylpentylidene)-amnio]-ethyl methacrylate;

2-[4-(2,6-dimethylheptylidene)-amino]-ethyl acrylate;

12-(cyclopenitylidene-amino)-dodecyl methalcrylate;

N-(1,3-dimethylbutylidene)-2-(2-methacryloxyethioxy)-ethylamine;

N-(benzylidene)-methacryloxyethoxyethylamine;

N-(1,3-dimethylbutylidene)-2-(2-acryloxethoxy)-ethylamine; and

N-(benzylidene)-2-(2-acryloxyethoxy)ethylamine.

The compounds of Formulas III and IV hydrolyze in acid, neutral, or alkaline aqueous media to produce the corresponding primary amines or salts thereof in which the group —N=Q of the formulas becomes —$NH_2$ and O=Q. The compounds of Formulas III and IV are disclosed in U.S. Pat. Nos. 3,037,969 and 3,497,485 and any of the monomeric compounds therein disclosed may be used.

Yet another polyfunctional amine polymer includes the product of the reaction of diamines and with polymers having acetoacetoxy groups, such as, for example, a polymer of acetoacetoxyethylmethacrylate and (meth)acrylic acid reacted with dimethylaminoethylpropylamine would yield a polyfunctional amine polymer containing both acid and amine functionalities.

Alternatively, acid functionality may be introduced by hydrolysis of a polyfunctional amine polymer. For example, partial hydrolysis of p(dimethylaminoethylmethacrylate) would result in a polymer containing both amine and carboxylic acid functionality. Any polymer derived from an amine monomer that yields acid functionality upon hydrolysis would be suitable for this method. Polyfunctionial amine polymers derived from dimethylaninoethylmethacrylate, t-butylaminoethylmethacrylate, oxazolidinylethyl methacrylate, and other amine containing monomers described herein would be suitable to undergo hydrolysis to give acid functionality. Hydrolysis of the polyfunctional amine polymer could be carried out in acidic, neutral, or alkaline media.

The polyfunctional amine polymer polymerized from a monomer mixture that includes at least one alkylaminoalkyl ester of α, β unsaturated carboxylic acid, such as, acrylic acid, methacrylic acid and at least one monoethylenically unsaturated carboxylic acid, such as, acrylic acid, methacrylic acid and mixtures thereof, are more preferred.

Essentially all of the polyfunctionial amine polymer is maintained in a deprotonated state by raising the pH of the aqueous evaporable medium of the polymer binder to the range of from 7.5 to 11, preferably from 9.5 to 10.5. This means essentially all of the amine functional groups in the polyfunctional amine polymer are in a deprotonated state. The pH of the aqueous evaporable medium is raised by adding a base, such as, ammonia; alkali metal hydroxide, such as, sodium hydroxide; morpholine and the lower alkyl amines, such as, 2-methylaminoethanol, 2-dimethylaminoethanol, N-methylmorpholine and ethylenediamine. Volatile bases, Such as, ammonia, or a mixture of volatile bases and nonvolatile bases, such as, sodium hydroxide, are preferred. Ammonia in particular is most preferred. As a result of deprotoniation of the amine functional groups in the polyfunctiolnal amine polymer, essentially all of anmine functional groups are uncharged, i.e., neutralized, thus preserving stability of the traffic paint composition.

In general, the polyfunctional amine polymers may be obtained by solution polymerization in aqueous media, either neutral, alkaline, or acidic, depending upon the particular polymer sought, for example, as taught in U.S. Pat. No. 4,119,600. The polyfunctional amine polymers include copolymers with up to 80 percent by weight of one or more monoethylenically unsaturated monomers, such as, methyl acrylate, acrylamide and methacrylamide. Small amounts of relatively insoluble comonomers may also be used to obtain the water-soluble polyfunctional amine polymer polymers. The insoluble polymers may contain larger amounts of these comonomers. Such monomers include, for example, acrylic acid esters with ($C_1$ to $C_{18}$) alcohols and methacrylic acid esters with alcohols having one to 18 carbon atoms, especially ($C_1-C_4$) alkanols; styrene, vinyltoluene, vinyl acetate, vinyl chloride, vinylidene chloride, substituted styrenes, butadiene, substituted butadienes, ethylene; and the nitrites and amides of acrylic or of methacrylic acid. The particular comonomer or comonomers used in making the polyfunctional amilie polymer polymers, depends upon the proportion of amine-containing monomer used in making the copolymer.

Polyfunctional amine polymers may also be prepared by reacting copolymers having a high levels of carboxylic acid functionality with an ethylene imine or propylene imine. By suitably adjusting the stoichiometric ratio, polyfunctional amine polymers having the desired level of amine and acid functionalities may be produced. Propylene imine is preferred.

The traffic paint composition contains from 30 percent to 70 percent, preferably from 35 to 65 percent, of the blend in the aqueous evaporable medium when the polymer binder is the dispersion of polymer particles, and from 25 to 50 percent, preferably from 30 to 40 percent of the blend in the aqueous evaporable medium when the polymer binder is the solubilized polymer, all percentages being in weight percents based on the total weight of the traffic paint composition.

If desired and depending on the intended use of the traffic paint composition, additional components may be added to the composition. These additional components include but are not limited to thickeners; rheology modifiers; dyes; sequestering agents; biocides; dispersants; pigments, such as, titanium dioxide, organic pigments, carbon black; extenders, such as, calcium carbonate, talc, clays, silicas and silicates; fillers, such as, glass or polymeric microspheres, quartz and sand; anti-freeze agents; plasticizers; adhesion promoters; coalescents; wetting agents; waxes; surfactants; slip additives; crosslinking agents; defoamers; colorants; preservatives; freeze/thaw protectors, corrosion inhibitors; alkali or water soluble polymers.

The present invention is further directed to a method applying and producing a traffic paint marking on a road surface. A first step thereof is directed to applying on a road surface a layer of the aforedescribed waterborne traffic paint composition. The layer of the coating composition may be applied by the methods known in the art, such as, for example, by spraying the composition on the road surface by means, such as, truck mounted spray guns where the paint composition is supplied from an air pressurized tank or by means of an airless pump. If desired, the traffic paint composition may be hand applied by means of a paint brush or a paint roller. The thickness of the layer of the waterborne traffic paint composition generally varies from 300 micrometers to 3000 micrometers, preferably from 350 micrometers to 1000 micrometers.

The second step of the method of the present invention is drying the layer for forming a traffic marking on the road surface. During the drying step, an aqueous evaporable medium in the traffic paint composition is evaporated from the layer applied to the road surface. The rate of evaporation of the aqueous evaporable medium is dependent upon the ambient conditions to which the layer of the traffic paint composition is exposed to and also upon the thickness of the layer applied to the road surface. It is to be noted that, the higher the atmospheric humidity, longer will be the no-pickup time for layer of the present composition, as evaluated under ASTM D 711-89.

If desired, the method of the present invention may include dropping glass beads on the layer of the traffic paint composition of the present invention when the layer is still wet to ensure the adhesion of the glass beads to the layer applied to the road surface. Facially disposed glass beads on the traffic markings act as light reflectors. If glass beads are not used, the traffic markings would be difficult to see under night and wet weather conditions. Thus, almost all of the traffic markings are beaded, i.e., glass beads sprinkled and affixed on top of the coatings roughly at the rate of 0.72 to 2.9 kilograms or more per liter of paint for providing night and wet weather visibility. The glass beads are dropped by methods known in the art, such as, by spraying the glass beads entrained and conveyed by a jet of air and dropping atop a wet layer of the traffic paint composition of the present invention or by sprinkling the glass beads at a desired rate from a storage hopper positioned above the wet layer. The amount of glass beads dropped on the layer is dependent upon the size, refractive index, and surface treatment of the glass beads. The typical glass beads specified for traffic markings are described under AASHTO Designation M 247-81 (1993) developed by American Association of State Highway and Transportation Officials, Washington, D.C. Optionally, glass beads may be premixed with the traffic paint composition before it is applied to road surfaces.

If desired, the wet layer of the traffic paint composition of the present invention may be contacted with a coagulant, which includes, weak acids, such as, aqueous acetic or citric acid, at a strength in range of from 10 percent to 30 percent, more preferably at 20 percent. Alternatively, stronger acids, such as, hydrochloric or sulfuric acids, diluted to a strength in the range of 5 to 15 percent, preferably 10 percent. Citric acid is preferred. The coagulant may be applied by any one of the conventional methods known in the art, such as, for example, by spraying the coagulant on the layer. It is believed without reliance thereon, that the coagulant when contacted with the layer coagulates the polymer binder present in the layer to improve the drying rate of the layer. The amount of the coagulant sprayed on the layer depends upon the amount of the polymer binder present in the layer and also upon the type of the polymer binder used in the traffic paint composition. The amount in weight percent of the coagulant sprayed on the layer of the coating composition depends upon the type of acid, its strength and the type of spraying equipment used in carrying out the coagulation step. The coagulant, such as, citric acid at 20 percent strength, applied at the rate in the range of 0.6 percent to 2 percent, preferably at 1 percent, all in weight percentages, based on the total weight of the coating composition applied as a layer, is more suitable.

The paint composition of the present invention is also suitable for use as an exterior coating over metal and wood substrate surfaces in addition to the asphalt and concrete surfaces discussed earlier.

TEST PROCEDURES

The following test procedures were used for generating the data reported in the Examples below:

Dry-to-No-Pickup Time

The traffic paint compositions were applied over 10 cms×30 cms glass test panels to form the layer of the traffic paint composition thereon. The thickness of the layer was controlled to about 320 microns. The test panels were then promptly placed in a test chamber supplied by Victor Associates, Inc., Hatboro, Pa. and maintained at a desired relative humidity of 85 percent to 90 percent. The test chamber was equipped with a certified hygrometer and a certified temperature indicator, both of which were fastened to the center of the rear wall of the test chamber to ensure balanced measurement. Prior to positioning the test panels inside the test chamber, the pan at the bottom of the test chamber was filled with 2 cms of water and then all the ports and doors were closed and the test chamber was allowed to equilibrate overnight. After overnight equilibration, the relative humidity within the test chamber reached 100 percent. By carefully opening and closing the various ports, the relative humidity within the chamber was then brought to the desired relative humidity. The door of the test chamber was opened briefly at 5 minute intervals to touch the wet paint films lightly with the tip of a clean finger. When the film was dry to a light touch, the panel was taken out of the test chamber and the dry-to-no-pickup time was determined in accordance with ASTM #D711 by rolling a traffic paint drying wheel over the wet film. The end point for the dry-to-no-pickup time is defined as the point in time where no paint adheres to the rubber rings of the test wheel. As stated earlier, the dry-to-no-pickup time of less than 20 minutes was considered acceptable.

Storage Stability

The traffic paint composition samples were tested for consistency in accordance with ASTM Standard Method #D 562 by using Thomas Stormer® Viscometer, Model VI-9730-G60, supplied by Paul N. Gardner Company, Inc., Pompano Beach, Fla. The traffic paint composition samples were then placed in sealed ¼ liter containers and stored in a sealed circulation oven at 60° C. for 10 days. The containers were then removed from the oven and allowed to cool to room temperature for 1 day. The containers were opened, mixed for 3 minutes on a mechanical mixer and immediately tested again for consistency under the aforedescribed ASTM Method #D 562. The stored traffic paint composition was rated to have passed the storage stability test, if the traffic paint composition consistency, as measured in Krebs units (KU), did not increase by more than 10 KUs from its measurement before it was stored in the oven.

EXAMPLE 1

Preparation of Anionically Stabilized Latex Polymer

To a 5-liter reactor containing 713 g of deionized water (DI water) under a nitrogen atmosphere at 81° C., 14 g of sodium lauryl sulfate (28% active), 112 g of monomer mixture disclosed in Table 1 below, 6.8 g of sodium carbonate dissolved in 40 g of DI water, and 5 g of sodium persulfate dissolved in 20 g of DI water were added with stirring. The remainder of the Monomer Emulsion No. 1 and a solution of 2 g of sodium persulfate dissolved in 90 g of DI water were gradually added to the reaction mixture in the reactor over a 3 hour period. At the end of the polymerization after cooling of to 60° C., 8.1 g of an aqueous solution of ferrous sulfate heptahydrate (0.15%), 1.6 g of t-butylhydroperoxide (70% active ingredient) in 18 g of DI water, and 0.6 g of sodium sulfoxylate formaldehyde dihydrate in 36 g of DI water were added. The reaction mixture was neutralized with ammonium hydroxide followed by the addition of 5.3 g of formaldehyde solution (37% active). The final product had a solids content of 51.7 percent by weight based on the total weight, a Brookfield viscosity of 300 cps (spindle 2 at 60 rpm using a Brookfield Model LVTD Viscometer), particle size of 156 nm, and a pH of 9.8.

TABLE 1

| | grams |
|---|---|
| DI water | 810 |
| sodium lauryl sulfate (28% active) | 14 |
| butyl acrylate | 886.4 |
| methylmethacrylate | 1032.2 |
| methacrylic acid | 25.2 |

EXAMPLE 2

Preparation of Dimethylaminoethylmethacrylate Homopolymer

To a 2-liter reactor containing 590 g of DI water under a nitrogen atmosphere at 75° C., 17.5 g of acetic acid, 2.4 g of an aqueous solution of ferrous sulfate heptahydrate (0.15%) diluted with 7.5 g of DI water, and 2.1 g of an aqueous solution of the tetrasodium salt of ethylenediamine tetraacetic acid (1%) diluted with 8 g of DI water were added, with stirring. Thereafter, 200 g of dimethylaminoethylmethacrylate along with a feed containing 4.2 g of t-butylliydroperoxide, 0.3 g of acetic acid diluted with 25.5 g of DI water and 2.5 g of sodium sulfoxylate formaldehyde dihydrate dissolved in 27.5 g of DI water were added over a 2 hour period to the reaction mixture in the reactor while maintaining the reaction temperature at 75° C. Upon completion of monomer and catalyst feeds, a redox pair composed of 0.52 g of t-butyuiydroperoxide and 0.14 g of sodium sulfoxylate formaldehyde dihydrate were added to the reaction mixture. The final product had solids content of 29.8 percent by weight based on the total weight of the product, Brookfield viscosity of 40 cps (spindle 2 at 60 rpm on a Brookfield Model LVTD Viscometer), and a pH of 7.9.

EXAMPLE 3

Preparation of Dimethylaminoethylmethacrylate (90%)/Methacrylic Acid (10%) Copolymer To a 2-liter reactor containing 414 g of DI water under a nitrogen atmosphere at 75° C., 15.6 g of acetic acid, 2.4 g of an aqueous solution of ferrous sulfate lheptahydrate (0.15%) diluted with 6 g of DI water, and 2.1 g of an aqueous solution of the tetrasodium salt of ethylenedianmine tetraacetic acid (1%) diluted with 6 g of DI water were added with stirring. A monomer mixture composed of 180 g of dimethylaminoethylmethacrylate and 20 g of methacrylic acid was added to the reactor over a two hour period, along with a feed of 4.2 g of t-butylliydroperoxide, 0.3 g of acetic acid diluted with 25.5 g of DI water and 2.5 g of sodium sulfoxylate formaldehyde dihydrate dissolved in 27.5 g of DI water. The reaction temperature was held at 75° C. Upon completion of nmonomer and catalyst feeds, a redox pair composed of 0.52 g of t-butyhydroperoxide and 0.14 g of sodium sulfoxylate formaldehyde dihydrate was added to the reaction mixture. Concentrated ammonium hydroxide was added to raise the pH to 9.0. The final product had a solids content of 29.8 percent by weight based on the total weight of the product anid a Brookfield viscosity of 3200 cps (spindle 4 at 60 rpm on a Brookfield Model LVTD Viscometer).

COMPARATIVE EXAMPLE 4 AND EXAMPLE 5

The Preparation of Traffic Paint Compositions

The polyfunctional amine polymer of Example 2 was added to the polymer binder of Example 1 to make the traffic paint composition of Comparative Example 4 and the polyfunctional amine polymer of Example 3 was added to the polymer-binder of Example 1 to make the traffic paint composition of Example 5 which is the traffic paint composition of the present invention. The following components, shown in Table 2 below, were also added in the order shown to produce respective pigmented traffic paint compositions (Comparative Example 4 and Example 5,):

TABLE 2

| | Amount Added (grams per 0.6 liter) | |
|---|---|---|
| | Comparative Example 4 | Example 5 |
| Latex Polymer of Example 1 | 267.0 | 267.0 |
| Water | 11.7 | 16.3 |
| Ammonia | 4.2 | 3.2 |
| Polyamine of: | | |
| Example 2 | 8.4 | — |
| Example 3 | — | 5.8 |
| Dispersant[1] | 2.6 | 2.6 |
| Surfactant[2] | 1.7 | 1.7 |
| Defoamer[3] | 1.3 | 1.3 |
| White Pigment[4] | 60.0 | 60.0 |
| Extender[5] | 456.4 | 456.4 |

The above components were mixed for 10 minutes to achieve a smooth dispersion of the pigment and extender. The following components, shown in Table 3, below, were added in the order shown with continuous mixing:

TABLE 3

| | Amount Added (grams per 0.6 liter) | |
|---|---|---|
| | Comparative Example 4 | Example 5 |
| Methanol | 18.0 | 18.0 |
| Coalescing Agent[6] | 13.8 | 13.8 |
| Defoamer[3] | 2.0 | 2.0 |
| Water | 6.3 | 10.3 |

Unless stated otherwise, the following commercial components were used:
[1]Tamol ® 901 Dispersant, an ammonium salt of an polyelectrolyte supplied by Rohm and Haas Company, Philadelphia, Pennsylvania @ 30 percent based on the solids.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chemical Company, Boonton, New Jersey.
[4]Ti Pure ® R-900 Titanium dioxide supplied by E.I. duPont de Nemours & Company, Wilmington, Delaware.
[5]Omyacarb ® 5, Ground natural calcium carbonate, evaluated under ASTM D 1199, Type GC, Grade II having a number average particle size of 5.5 microns with maximum oil absorption No. of 10, supplied by Omya, Inc., Proctor, Vermont.
[6]Texanol ® Ester alcohol supplied by Eastman Chemicals, Kingsport, Tennessee.

Dry-to-No-Pickup Time and Storage Stability Evaluation

The traffic paint composition of Comparative Example 4, Comparative Example 6 (Conventional waterborne traffic paint klown as Dura-Line 2000™ traffic paint, which is supplied by Morton International Inc., Chicago, Ill., having more than 80 percent solids by weight and containing no amine functionality) and Example 5 were applied to a wet film thickness of approximately 320 microns on glass test panels and evaluated for dry-to-no-pickup times and for storage stability in accordance with the procedure described earlier. The test results are shown in Table 4 below:

TABLE 4

| Paint Property | Comparative Example 4 | Example 5 | Comparative Example 6 |
|---|---|---|---|
| Dry-to-No-Pickup Time (minutes) | 40 | 10 | 20 |
| Storage Stability | pass | pass | fail |
| KU before storage | 83 | 88 | 102 |
| KU after storage (10 days at 60° C.) | 93 | 88 | 141 |

KU means Krebs units.

It is seen from Table 4 that Example 5 containing the polyfunctional amine polymer copolymerized from amine and acid monomers has a dry-to-no-pickup time that is significantly less than that of Comparative Example 4 containing the polyamine homopolymer (no acid functionality) and comparative Example 6, which does not contain the polyamine polymer. Comparative Example 4 met the requirement of the storage stability test and Example 5 significantly exceeded the storage stability test showing no deterioration. By contrast, Comparative Example 6 failed the storage stability test. Thus, from Table 4 it can be seen that applicants have made an unexpected discovery that the presence of an acid functionality in the polyfunctional amine polymer of the present traffic paint composition not only significantly improves the dry-to-no-pickup time but it also improves the storage stability.

What is claimed is:

1. A storage stable fast-cure aqueous composition comprising a blend in an aqueous medium of an anionically stabilized polymer binder having a Tg greater than 0° C., a polyfunctional amine polymer polymerized from a monomer mixture comprising at least one acid and at least one amine monomer, and an amount of volatile base sufficient to raise the pH of the composition to a point where essentially all of the polyfunctional amine polymer is in a non-ionic state.

2. The composition of claim 1 wherein said polyfunctional amine polymer is polymerized from a monomer mixture comprising 2 to 20 percent of an acid monomer.

3. The composition of claim 1 wherein said acid monomer is selected from the group consisting of monoethylenically unsaturated carboxylic acid, half-ester of ethylenically unsaturated dicarboxylic acid, half-amide of ethylenically unsaturated dicarboxylic acid, monomethyl itaconate, monomethyl fumarate, monobutyl fumarate, acrylamido propane sulfonate, sodium vinyl sulfonate, 2 acrylamido-2-methylpropanesulfonic acid, 2-methacryloxyethyl phosphate, phosphoethyl(meth)acrylate, and various mixtures thereof.

4. The composition of claim 1 wherein said polyfunctional amine polymer is polymerized from a monomer mixture comprising 80 to 98 percent of an amine monomer.

5. The composition of claim 1 wherein said amine monomer is selected from the group consisting of alkylaminoalkyl ester of α, β unsaturated carboxylic acids, alkylaminoalkyl amide of unsaturated acids, aminoalkyl vinyl ether or sulfide, vinyl pyridine, N-acryloxyalkyl-oxazolidine, N-acryloxyalkyltetrahydro-1,3-oxazine; and various mixtures thereof.

6. A storage stable fast-cure aqueous traffic paint composition comprising a blend in an aqueous medium of 0.25 weight percent to 10 weight percent based on blend solids of a polyfunctional amine polymer polymerized from a monomer mixture comprising at least one acid and at least one amine monomer, an anionically stabilized polymer binder having a Tg greater than 0° C., and an amount of volatile base sufficient to raise the pH of the composition to a point where essentially all of the polyfunctional amine polymer is in a non-ionic state.

* * * * *